United States Patent
Shiel

(10) Patent No.: US 9,395,712 B2
(45) Date of Patent: Jul. 19, 2016

(54) BUILDING ENERGY USAGE REDUCTION BY AUTOMATION OF OPTIMIZED PLANT OPERATION TIMES AND SUB-HOURLY BUILDING ENERGY FORECASTING TO DETERMINE PLANT FAULTS

(71) Applicant: Patrick Andrew Shiel, Dublin (IE)

(72) Inventor: Patrick Andrew Shiel, Dublin (IE)

( * ) Notice: Subject to any disclaimer, the term of this patent is extended or adjusted under 35 U.S.C. 154(b) by 0 days.

(21) Appl. No.: 14/607,011

(22) Filed: Jan. 27, 2015

(65) Prior Publication Data

US 2015/0198962 A1    Jul. 16, 2015

Related U.S. Application Data

(63) Continuation-in-part of application No. 13/906,822, filed on May 31, 2013, now Pat. No. 8,977,405.

(51) Int. Cl.

| | |
|---|---|
| G05D 3/12 | (2006.01) |
| G05B 15/02 | (2006.01) |
| G05F 1/66 | (2006.01) |
| G06Q 10/04 | (2012.01) |
| G05B 13/04 | (2006.01) |
| G06N 99/00 | (2010.01) |
| F24D 19/10 | (2006.01) |
| G06Q 10/06 | (2012.01) |
| G06Q 50/06 | (2012.01) |
| G06Q 50/16 | (2012.01) |

(Continued)

(52) U.S. Cl.
CPC ............ *G05B 15/02* (2013.01); *F24D 19/1048* (2013.01); *F24D 19/1081* (2013.01); *G05B 13/048* (2013.01); *G05F 1/66* (2013.01); *G06N 99/005* (2013.01); *G06Q 10/04* (2013.01); *G06Q 10/06* (2013.01); *G06Q 50/06* (2013.01); *G06Q 50/16* (2013.01); *F24F 2011/0047* (2013.01); *F24F 2011/0058* (2013.01); *F24F 2011/0075* (2013.01); *G06F 17/5004* (2013.01); *G06F 17/5009* (2013.01); *G06F 2217/80* (2013.01)

(58) Field of Classification Search
CPC ........ G06Q 10/04; G05B 15/02; G05B 13/02; G05B 13/026; G05B 2219/50065; Y02B 70/3241
See application file for complete search history.

(56) References Cited

U.S. PATENT DOCUMENTS

| | | | |
|---|---|---|---|
| 2009/0204267 A1* | 8/2009 | Sustaeta ............. | G05B 13/0285 700/291 |
| 2011/0130886 A1* | 6/2011 | Drees ..................... | G05B 15/02 700/291 |
| 2011/0153103 A1* | 6/2011 | Brown .................. | G06Q 10/04 700/291 |

(Continued)

OTHER PUBLICATIONS

Chaves et al., Forecasting of energy production and consumption in Asturias (northern Spain), Energy 24 (1999) 183-198.*

(Continued)

*Primary Examiner* — Darrin Dunn

(57) ABSTRACT

The invention provides a method for improved building energy usage reduction by computer automation of optimized plant operation times and sub-hourly building energy forecasting to determine plant faults. The invention provides a computer system to derive the NTL, mechanical heat-up (MHL) and mechanical cool-down (MCL) lags and in conjunction with a readily available interval weather forecast, the system can output various signals to indicate optimized start and stop times for heating and cooling equipment. The algorithm to calculate the 15-minute energy forecast is used to indicate out-of-control conditions in the operation of the plant.

1 Claim, 3 Drawing Sheets

Block diagram of the software system to generate a 15-minute forecasting model based on external temperature and energy usage data alone

(51) Int. Cl.
*F24F 11/00* (2006.01)
*G06F 17/50* (2006.01)

(56) References Cited

U.S. PATENT DOCUMENTS

| | | | | |
|---|---|---|---|---|
| 2011/0160927 A1* | 6/2011 | Wilson | ............... | G06Q 10/04 700/291 |
| 2012/0010757 A1* | 1/2012 | Francino | ............ | G05B 15/02 700/291 |
| 2012/0022700 A1* | 1/2012 | Drees | ................. | G05B 15/02 700/276 |
| 2012/0101648 A1* | 4/2012 | Federspiel | ......... | G05D 23/1934 700/291 |
| 2012/0232701 A1* | 9/2012 | Carty | .................... | G05B 15/02 700/277 |

OTHER PUBLICATIONS

Hagan et al., The Time Series Approach to Short Term Load Forecasting, IEEE, 1987.*
Pao, Forecasting energy consumption in Taiwan using hybrid non-linear models, Enery 34 (2009) 1433-1446.*
Hesterberg et al., A Regression-Based Approach to Short-Term System Load Forecasting, IEEE, 1990.*

* cited by examiner

Block diagram of the software system to generate a 15-minute forecasting model based on external temperature and energy usage data alone

| For each lag from 0 hours to 8 hours | | |
|---|---|---|
| | For each window size between 2 hours and 20 hours | |
| | | Determine R-Sq and RMSE using average lagged temperature over the indicated window size as a predictor for energy usage. |
| | | If higher than previous best R-squared and at least equal or lower to the previous RMSE, set window+lag as current best |
| | Determine and output best fit regression model | |

Nested algorithm to determine the best-fit regression model for energy usage in buildings using only external temperature as the sole predictor

Figure 2

Overall system architecture – Forecasting and control system overview

BUILDING ENERGY USAGE REDUCTION BY AUTOMATION OF OPTIMIZED PLANT OPERATION TIMES AND SUB-HOURLY BUILDING ENERGY FORECASTING TO DETERMINE PLANT FAULTS

RELATED APPLICATIONS

This application is a continuation in part of U.S. application Ser. No. 13/906,822 by the same inventor, entitled Continuous Optimization Energy Reduction Process in Commercial Buildings, filed May 31, 2013, docket SHIEL002. The entirety of application Ser. No. 13/906,822, (US publication number US 2013-0304269 A1) is incorporated by reference as if fully set forth herein.

This application is also related to U.S. applications with docket numbers SHIEL003 and SHIEL004, each by the same inventor and each a continuation in part of U.S. Ser. No. 13/906,822, and where the entireties of each of SHIEL003 and SHIEL004 are incorporated by reference as if fully set forth herein.

GOVERNMENT FUNDING

None

FIELD OF USE

The invention is useful in energy management, and more particularly in the field of energy management in commercial buildings.

BACKGROUND

Energy use analysis in commercial buildings has been performed for many years by a number of software simulation tools which seek to predict the comfort levels of buildings while estimating the energy use. The underlying principles of these tools concentrate on the building itself and the desire to keep that building at a particular level of warmth and/or humidity.

Occupant comfort is assumed to be serviced based on generalized set of parameters and tables used by designers in specifying the building and plant within it. It has been shown over several years, that the predictive strength of these tools is not strong when comparing the design estimates of energy use with the reality, post-occupation.

BRIEF SUMMARY OF THE INVENTION

The invention provides improved building energy usage reduction by computer automation of optimized plant operation times and sub-hourly building energy forecasting to determine plant faults.

The invention provides computer implemented method to forecast energy usage in buildings in 15-minute intervals. This implementation is achieved by the following steps:
1) Determination of the unique building's natural thermal lag (NTL) by linear regression. This regression is based on energy usage and external temperature (SHIEL003)
2) Use of the NTL to generate the best fit regression model to forecast energy usage on a daily total basis (or average hourly) (SHIEL003)
3) Determine the days from the model training data which exhibit a similar external temperature profile over the working part of the day in question to yield a set of 'matching days'
4) This is determined by the application of the sum or squares algorithm outlined in Eqn 1
5) Using the energy profile exhibited during these 'matching days', proportionately assign the forecast of total daily energy for the day in question into 15-minute usage figures In 3), the days which exhibit the closest matching temperature profile over the lag window period is determined by use of the following equation:

$$SS = \sum_{i=1}^{p} (T_{AF_i} - T_{C_i})^2 \qquad \text{Eqn 1}$$

where
SS represents the summation of the squares over the period i=1 to p, where p matches the optimal window size as determined in the previous section (FIG. 2)
p is the number of 15 minute observations examined (e.g. 40 for a typical 10-hour working day window)
$T_{AF_i}$ is the actual outside temperature at time period i, on the day the energy usage has been forecast
$T_{C_i}$ is the actual external temperature at time period i on any day to which the forecast day is being compared.

The day with the lowest value of SS corresponds to the day for which the external temperature profile most closely matches the temperature profile of the day for which the energy is being forecast. If several days exist in the model training data which are close in external temperature profile to the forecast day, these are averaged to yield a slightly more accurate comparison. This derivation represents a simple and accurate method which is implemented on a digital computer, to forecast heating and cooling energy usage in 15-minute increments.

In an alternate embodiment, the invention provides an improved computer implemented method to optimize the operation of heating and cooling plant in a building.

Following the implementation of the preferred embodiment set forth hereinabove, the following further step is implemented to facilitate the creation of optimized heating and cooling plant operation times, based on a 12 hour weather forecast:

Using an interval (15 or 30 minute) 12-hour weather forecast and with knowledge of the NTL (SHIEL003) and mechanical heat-up (MHL) and mechanical cool-down (MCL) lags (SHIEL004), determine the optimum startup up and shutdown times for the boiler and chiller plant.

The data collation, analysis and subsequent creation of the plant schedule files and set-points are understood by referring to FIG. 3 herein.

The invention also provides for 15-minute interval forecasts of energy usage, when compared to actual real-time energy usage, are useful to alert the building operator as to the likelihood of out-of-control situations or plant malfunctions. A variable margin of difference is be applied to this function depending on whether large or small day-to-day variations in energy usage are be commonplace.

BRIEF DESCRIPTION OF THE DRAWINGS

The drawings provided as an aid to understanding the invention:

FIG. 2 Nested algorithm to determine the best-fit regression model for energy usage in buildings using only external temperature as the sole predictor;

DETAILED DESCRIPTION OF A PREFERRED EMBODIMENT OF THE INVENTION

Introduction

Figure 1:
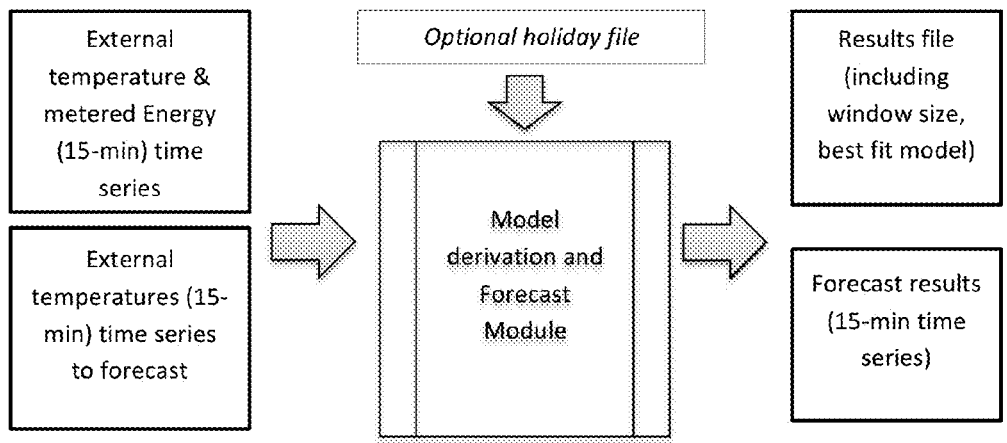
FIG. 1 shows a block diagram of the software system to generate a 1.5-minute forecasting model based on external temperature and energy usage data alone.

In SHIEL002 (U.S. application Ser. No. 13/906,822, incorporated by reference as if fully set forth herein), a building's unique natural thermal lag (NTL) was determined by comparing internal space temperature and the corresponding external temperature during a period of time when the building is at rest with no mechanical heat or cooling, little or no solar gain and little or no occupant activity. The NTL indicated how far back in time the most influential window of external temperatures affecting energy usage, occurred.

The NTL derivation in SHIEL002 has facilitated the creation of simple, accurate and unique statistical models capable of forecasting individual building's energy usage on a daily total or average hourly basis, if the operating hours of the building are known. The method described in SHIEL002 requires 15-minute interval data for external temperature, internal space temperature and energy usage.

The invention method provides a method of automatically finding the natural thermal lag and the optimum lag window size for this lag, using only external temperature and energy usage. Using this NTL information, a simple forecasting model is be derived and the energy usage is forecast for the full day. Next, using a method similar to that described in SHIEL002 for finding the NTL, daily total energy is disaggregated on a 15 minute basis over the working day. This is done using only the 15-minute energy usage data available from most of the Utility Companies, such as PG&E.

Finally, by using the findings explained in SHIEL003 and SHIEL004, a computer system is used to derive the NTL, mechanical heat-up (MHL) and mechanical cool-down (MCL) lags and in conjunction with a readily available interval weather forecast, the system outputs various signals to indicate optimized start and stop times for heating and cooling equipment. The algorithm to calculate the 15-minute energy forecast is used to indicate out-of-control conditions in the operation of the plant.

For the buildings analysed in SHIEL002, the size of the most influential window of external temperatures (the NTL) was found to be 10 hours. In SHIEL002, this is referred to as the Lag Window (LW). Given the variation of building characteristics and the variation of climates in which buildings of interest are located, it is of interest to automatically determine not only the most influential window of external temperatures in time but also the size of this window.

By having knowledge of the natural thermal lag and the optimal lag window size, this information can be used to improve building energy efficiency by varying the plant (heating and cooling) start and stop times because it is understood how quickly the building will respond to any changes in external temperature.

The method used to determine the best NTL and the size of the Lag Window (LW) also produces a statistical model which is used to forecast energy usage on an average hourly basis. This method is very useful to test if a building is performing to specification and is also used to determine if certain plant is functioning correctly or having technical problems. This method has been further refined to facilitate the accurate forecasting of energy usage on a 15 minute interval basis.

Alternatively, using an interval weather forecast (15 or 30 minute intervals), provides prediction of improved plant start and stop times for any given building. This is because the conventional implementation of start and stop times of plant installed in commercial buildings is usually set at fixed times of the working day. By knowing when the building will respond to the external temperature which is forecast to occur in the future, based on the NTL, it is possible to further improve the energy efficiency of buildings based on more closely matched plant start and stop times and set points to which that plant operates.

System Design and Data Flow

The computer system uses 15-minute interval data from the periods of winter heating and separately summer cooling. This interval data results in a forecasting model capable of producing 15-minute interval forecasts for heating and cooling. The forecasting interval will always match the interval of the input data. The full list of intervening steps is shown in FIG. 1. The system requires external temperature and metered energy (thermal or electrical), recorded on a 15-minute basis. The period over which the energy usage is to be forecast requires the input of 15-minute external temperatures. The optional holiday file eliminates certain days when the building is non-operational, for instance. The results from the model derivation and forecast modules include the best fit regression model (based on the natural thermal lag and lag window size) and a forecast of the energy usage (thermal or electrical) on a 15-minute basis (matching the input interval data).

Model Derivation

The model uses the average outside temperature to forecast the energy usage in a building for each day, both recorded at 15-minute intervals. The average outside temperature is calculated over a window of individual measurements ending at the closing time of the building and which takes the natural thermal lag (NTL) of the building into account. In other words, if the NTL of the building during the winter has been found to be approximately 4 hours, for instance, then the window of individual measurements over which the temperature average is formed, should be 4 hours prior to the closing time of the building. The length of the lag window over which the temperature is averaged is determined by that window which gives the most accurate forecast (as determined by the R-squared value). This can vary from building to building but is typically 10 hours.

So for example, for a sample office building which closes at 18:00, has a natural thermal lag of 4 hours and a 10 hour window, it is determined, gives most accurate results, the daily average temperature is calculated over the ten hours from 04:00-14:00 (14:00 is 4 hours prior to closing time, and 04:00-14:00 gives the 10 hour window).

Two different energy totals are computable using the model—either the total energy for that day, or the total energy per hour of operation. Both are computed, but in practice it has been found that the latter gives marginally better results, assuming the working hours of the building are known. Where these working hours are unknown, the daily total energy usage figure must be relied upon.

This derivation of the model is summarized hereinbelow.

According to SHIEL002 (U.S. application Ser. No. 13/906, 822, US publication number US 2013-0304269 A1), to calculate the NTL of a building, quarter hourly time series of both external and internal temperatures over a period when the building in passive (i.e. neither heated no cooled) is required. This data is normally collected over the weekends throughout the year and then used to calculate the NTL for each day. The NTL can vary as the outside temperature varies throughout the seasons, and is typically longer in the summer when the outside air temperature is closer to the typical office temperature and, therefore, thermal losses and/or gains are reduced.

As this internal temperature data is rarely available for a building, it has been determined by corollary, that the NTL can be estimated by finding the lag for which the best correlation between outside temperature and energy usage (heating during winter, cooling energy during the summer) exists. It is this theoretical basis which informs the algorithm. A summary is shown in FIG. 2.

Thus, the algorithm now becomes a search for the combination of NTL and window size which gives the strongest predictive strength (as measured by the coefficient of determination (R-Sq) and the level of variance in a single regression model (identical to Root Mean Square Error (RMSE)). Best results are found by training the heating energy model during the heating season only and the cooling energy model during the cooling season only.

Creating the Forecast

Once the best regression model has been determined, it is used to calculate the daily total energy (or hourly usage, according to the best model as determined above) for each day in the forecast file. At this stage, the statistical regression model forecasts a single value per day. This single value of total daily energy usage is disaggregated across the 24 hour day using the energy profile from a training day whose temperature profile best matches the temperature profile for the forecast day. This best match is determined using a statistical least squares algorithm which is similar in mathematical profile to that described in SHIEL002 for the determination of the NTL for any given external temperature average. The particular least squares algorithm used in this case takes the form of:

$$SS = \sum_{i=1}^{p} (T_{AF_i} - T_{C_i})^2 \qquad \text{Eqn 1}$$

where

SS represents the summation of the squares over the period i=1 to p, where p matches the optimal window size as determined in the previous section (FIG. 2)

p is the number of 15 minute observations we wish to examine (e.g. 40 for a typical 10-hour working day window)

$T_{AF_i}$ is the actual outside temperature at time period i, on the day the energy usage has been forecast $T_{C_i}$ is the actual external temperature at time period i on any day to which the forecast day is being compared The day with the lowest value of SS corresponds to the day for which the external temperature profile most closely matches the temperature profile of the day for which the energy is being forecast. If several days exist in the model training data which are close in external temperature profile to the forecast day, these are averaged to yield a slightly more accurate comparison.

Overall Algorithm Description

A process of forecasting thermal and electrical energy usage in commercial buildings on a 15-minute basis is provided by the invention. The process uses only 15-minute interval data for external temperature and energy usage and, therefore, is easily applicable to commercial buildings since sources of both of these data are readily available.

Figure 3:
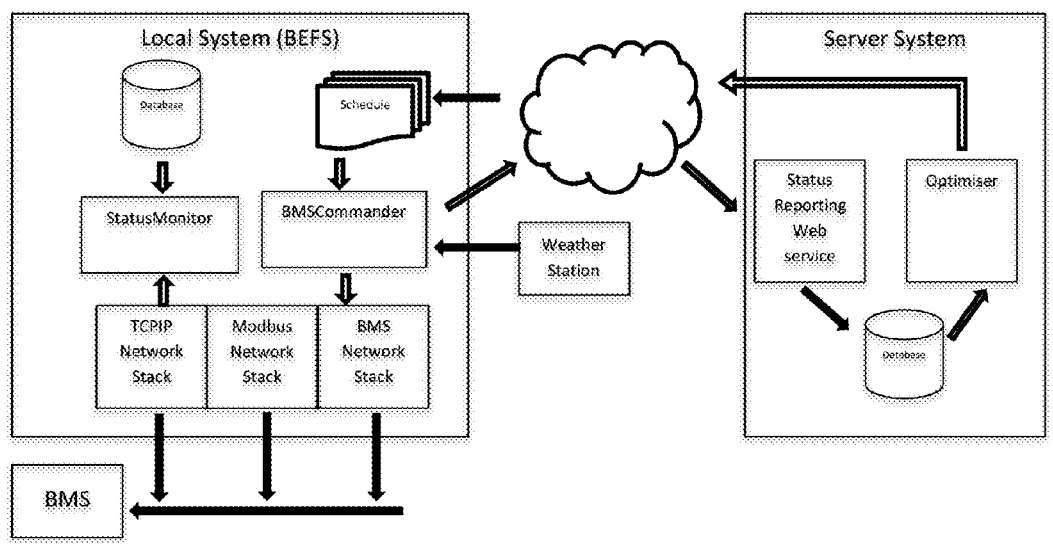
FIG. 3 shows Overall system architecture—Forecasting and control system overview.

The process can be readily implemented on a digital computer and can be summarized as follows:

1. Determination of the unique building's natural thermal lag (NTL) by linear regression. This regression is based on energy usage and external temperature
2. Use of the NTL to generate the best fit regression model to forecast energy usage on a daily total basis (or average hourly)
3. Determine the days from the model training data which exhibit a similar external temperature profile over the working part of the day in question to yield a set of 'matching days'
4. This is determined by the application of the sum or squares algorithm outlined in Eqn 1
5. Using the energy profile exhibited during these 'matching days', proportionately assign the forecast of total daily energy for the day in question into 15-minute usage figures
6. Using an interval (15 or 30 minute) 12-hour weather forecast, with knowledge of the NTL and mechanical heat-up (MHL) and mechanical cool-down (MCL) lags, determine the optimum start-up and shutdown times for the boiler and chiller plant Local Implementation The algorithm as listed in the previous section (steps 1 to 6) outlines the operations required to get from the calculation of the building's natural thermal lag (NTL) through to the optimized start and stop times for heating and cooling plant (MHL and MCL), and finally, to the forecasting of optimized energy usage which allows the system to alert the building operator in the event of higher (or lower) energy usage. This higher or lower usage would normally indicate a problem with plant schedules or some faulty operation. The local implementation is used to influence the behavior of the installed building management system (BMS). The system has been implemented with the following hardware and software architecture. For convenience, the local system installed in the building under review has been referred to as the building energy forecasting system (BEFS), see FIG. 3.

In order to implement this functionality several software modules are required on the server and the local systems (BEFS). Specifically:

Server Software Modules

The software necessary to implement the server-based functions listed above is implemented in the following software modules on the server:

Building characterisation module
Optimizer module
BEFS schedule file creation module
Log file parser module
Logging web service module
Monitoring and reporting module
Management user interface module Building Energy Forecasting System Software Modules The software necessary to implement the BEFS-based functions listed above will be implemented in the following software modules on the BEFS:

1. Schedule file parser
2. BMS commander
3. Sensor monitor
4. Log file uploader
5. System monitor
6. Communication stacks
    a. Modbus
    b. BMS specific
    c. TCPIP Server Software Overview The following is a list of abbreviated module descriptions:

Building Characterisation Module

The building characterisation uses the internal building temperatures and weather data to calculate a number of building characteristics (e.g. thermal lags) which are stored in the database. This module is only run when building characteristics have to be generated for a new building.

Optimizer Module

The optimization file generation process uses the building characteristics along with the forecast data and the particular building's BMS attributes, to generate the daily control schedules for the building's BEFS. These instructions are stored in the database and the local system schedule file transmission module uses this data to generate the schedule files and transmits them to the local systems in the field.

The Optimizer module runs on a daily basis.

BEFS Schedule File Creation and Transmission Module

The BEFS file creation module generates the schedule file contents based on the instructions generated by the Optimizer module and stored in the database. This module stores these files locally and transmits the files to the relevant BEFS.

The file transmission module runs on a daily basis.

Log File Parser Module

The log file module parses log files received from local system in the field, and stores the contents in the database. The files generally contain the readings from sensors (e.g. weatherstation or an environmental sensor tower) connected to the local system at the customer site.

The Log file parser module runs on a daily basis.

Logging Web Service Module

The logging web service is a web service which is used by the local system in the field to log their status, commands issued and any error conditions to the database. It is also used to provide the real time logging of sensor data for the local system in the field which are configured to log "live" data.

This web service runs all the time.

Monitoring and Reporting Module

The monitoring and reporting service is used to manage the local systems in the field and ensure that all are functioning correctly. It allows operations personnel monitor the installed base of local systems on a real time basis. The software checks status messages received from each local system and can be configured to email local operations personnel in case of errors or local system failing to contact the central server.

The reporting module emails a daily report showing the status of the various local systems in the field, highlighting any which are not performing correctly.

Installed System Management Module

The installed system management tool is used to configure the installed base of local systems. It will also allow the user to view logged data, view and edit building characteristics etc. It should also allow schedule files to be manually edited, regenerated and pushed to the remote local systems on an ad hoc basis.

Local System Software Overview

The following is a list of abbreviated module descriptions contained in the local system or BEFS:

BEFS Software Overview

The BEFS is a small embedded system which is used to influence the behavior of the BMS as the outside weather patterns change. The BEFS interacts with the BMS using the configured communications stack (Modbus/TCPIP will initially be supported).

Schedule File Parser

The schedule file parser reads uploaded files and stores them in the local database.

BMS Commander

The BMS Commander program reads commands from the current schedule file and transmits them at the appropriate time to the BMS using the configured communications stack. Once the command is issued (and acknowledged if possible) the details are logged online to the central server.

Sensor Monitor

The sensor monitor periodically reads connected sensors and stores the results locally in a log file. The data is optionally transmitted in real time to the Verteco central server. A new file is created for each day and this file is transmitted to Verteco once per day using the Log File uploader program.

Sensors can be connected to the BEFS directly (e.g. the Weatherstation) or indirectly (read via the BMS). The connection using any of the communications stacks available. (This may also allow the reading of BMS sensors in real time).

Log File Uploader

The log file uploader program transmits the sensor log file(s) to the central server once per day. It operates in a similar fashion to the current file uploader.

System Monitor

The system management module logs ensure that the BEFS system is healthy and reports back to the central monitoring system on a periodic basis.

Communications Stack

Both the BMS commander and the sensor monitor communicate with external devices in order to provide their functionality. Given the variety of BMS systems and sensors, a separate communications stack (all implementing the same generic interface) is used to provide the necessary flexibility. Initially three stacks are required: Modbus, BMS and TCPIP.

Configuration & address-port mappings for each stack are held in separate database tables for each stack as each has a different addressing mechanism.

Modbus

Modbus is a simple & robust serial protocol used to communicate with controllers and sensors in the control world. Devices are addressed using a simple Address-Register pair to uniquely identify a value to read/write. Registers are normally 1, 2, or 4 bytes in length.

BMS Network Stack

Commonly available hardware devices allowing the BMS Commander to directly control the analog and digital signals sent to a connected system (typically the BMS). The devices can also be used to read analogue and digital signals from an attached BMS and/or sensor(s).

TCP/IP

The TCPIP protocol is increasingly used by modern or updated BMS systems to communicate with its outstations. As the message format is likely to vary according to the attached BMS, we will implement the TCPIP stack as the need arises.

What is claimed is:

1. An improved computer implemented method to forecast energy usage in 15-minute periods in a commercial building with an installed heating and cooling plant and a building management system, wherein, for said building of interest, the computer performs the following steps:
   a) determining a building's natural thermal lag (NTL) by linear regression based on a data set of daily energy usage and external temperature for a plurality of days;
   b) using said natural thermal lag to generate a best fit regression model to forecast said building's daily energy usage;

c) determine which of said plurality of days exhibit external matching temperature profile to yield a set of matching days by:

$$SS = \sum_{i=1}^{p} (T_{AF_i} - T_{C_i})^2$$

where
SS represents a summation of squares over period i=1 to p, where p matches an optimal window size, wherein
p is a preselected number of 15 minute periods
$T_{AF_i}$ is outside temperature at time period i, on said preselected day
$T_{C_i}$ is actual external temperature at time period i on day selected for comparison to said preselected day
d) using an energy profile exhibited during said matching days, proportionately assigning said forecast of said building's daily energy usage for said preselected day into forecast of energy usage during a preselected number of 15-minute periods;
e) calculating for said preselected day a start time for said building's installed heating and cooling system; and
f) controlling chilling pumps using instructions received from said building management system at said start time.

\* \* \* \* \*